United States Patent Office 3,437,640
Patented Apr. 8, 1969

3,437,640
PROCESS FOR PREPARING A MODIFIED POLYOXYMETHYLENE
Carl Earle Schweitzer, Wilmington, Del., and Robert Alton Setterquist, Vienna, W. Va., assignors to E. I. du Pont de Nemours and Company, Wilmington, Del., a corporation of Delaware
No Drawing. Continuation-in-part of application Ser. No. 124,021, July 14, 1961. This application Mar. 24, 1965, Ser. No. 442,545
Int. Cl. C08g *1/22, 1/20, 1/14*
U.S. Cl. 260—67     11 Claims

ABSTRACT OF THE DISCLOSURE

A process for modifying a high molecular weight polyoxymethylene by the addition of units different from polyoxymethylene either at the ends of the polymer chain and/or within the polymer chain which consists of contacting the polyoxymethylene with dioxolane or polydioxolane in the presence of a Lewis acid, e.g. boron trifluoride etherate, and at a temperature in the range 0 to 200° C., optionally in the presence of a diluent, e.g. toluene.

---

This case is a continuation-in-part of U.S. application Ser. No. 124,021, filed July 14, 1961.

This invention relates to a novel process for preparing stable, modified polyoxymethylene, and, more particularly, it relates to the modification of polyoxymethylene having a number average molecular weight of at least 10,000 by reacting the polyoxymethylene with dioxolane or polydioxolane to obtain a modified polyoxymethylene having a number average molecular weight of at least 10,000. This product may have improved chemical properties, e.g., stability towards bases, and, if desired, modified physical properties, e.g., decreased melting point, as compared to the untreated polymer.

One part by weight of polyoxymethylene starting material, preferably having a hydroxyl group for at least one of the two terminal portions of the polymer chain and having a number average molecular weight of at least 10,000, is reacted with 0.01 to 100 parts by weight of dioxolane or polydioxolane in a mildly acidic reaction medium, e.g., in the presence of 0.0001 to 0.5 part by weight based upon the polymer of an acid, and, preferably, a Lewis acid, such as boron trifluoride, and thereafter a polyoxymethylene having a number average molecular weight of at least 10,000 is recovered.

Linear formals which are structurally similar to polydioxolane are included in that term, e.g., the linear polymer of ethylene glycol and formaldehyde. Examples of these formals are found in U.S. Patents 2,350,350, issued June 6, 1955 to W. F. Gresham; 2,395,265, issued Feb. 19, 1946 to W. F. Gresham and 2,475,610, issued July 12, 1949 to W. F. Gresham et al.

The polyoxymethylene starting material employed in the process of this invention is a polymer having chains of recurring oxymethylene units (—CH$_2$O—) or chains containing a predominance of the aforementioned units with the chain normally terminated at each end by a hydroxyl group, an ether group, or an ester group. Usually, at least one of the two terminal groups of the chain of the starting polymer is a hydroxyl group, which, in turn, is reacted with the dioxolane or polydioxolane to produce the modified polyoxymethylene. Polyoxymethylenes having ether linkages on the ends of the polymer chain are base stable but may be modified by the process of the present invention.

Polymers which have been treated according to the process of the present invention may have chains which are predominantly (—CH$_2$O—) units with base stable ends or may contain from 0.1 to 10 mole percent of a unit intercalated therein which introduces at least one —C—C— linkage into the main chain of the polymer. As the number of intercalated units in the main chain of the polymer increases, the melting point of the polymer decreases. The decrease in melting point of the polymer improves the processability of the polymer, i.e., permits molding over a wide temperature range.

The preferred catalysts for the process of the present invention are phosphorus pentafluoride, triethyl oxonium fluoborate and boron trifluoride. Examples of other acids or acid-reacting compounds that may be used as catalysts within the scope of this invention to provide a mildly acidic reaction medium include Lewis acids usually of the Friedel-Crafts type, such as aluminum trichloride, tin tetrachloride, tin tetrabromide, ferric chloride, titanium tetrachloride, zinc bromide, boron trichloride, antimony trichloride, antimony triiodide, antimony pentachloride, antimony pentafluoride; protonic or Bronsted acids with a pKa of less than 5.5, including organic acids such as hydroxyacetic, trichloroacetic, and paratoluene sulfonic, and inorganic acids such as sulfuric, hydrochloric and phosphoric acids and the like. The salts of strong acids (pKa less than 2.0) with weak bases may also be used. The acid catalyst should be compatible with the dioxolane or polydioxolane, i.e., should not form insoluble complexes therewith in the case of the slurry or solution process and should not form nonvolatile complexes in the case of a vapor phase process. Strong acids and acids which are strong oxidizing or reducing agents should be used sparingly to prevent excessive degradation of the unreacted polymer by causing the reaction medium to be more than mildly acidic. Excessive degradation may also be avoided by adding these acids in such a manner that the contact time of the acid with the unreacted polymer is held at a minimum. The preferred range of concentration of acid catalysts, excluding the Lewis acids, is from 0.001–0.5 parts per part of polymer. The same range is preferred for their salts with weak bases. Certain complexes of the aforementioned acid halides are operable in the present invention and may be preferred when it is desired to employ a liquid catalyst. Such complexes which are considered within the scope of the present invention include tertiary amine complexes, alcohol complexes and ether complexes, the preferred ether being diethyl ether. Specific examples of alcohols which may be used in the present examples are methanol, ethanol or butanol. Examples of other ethers are the dialkyl ethers, such as dimethyl ether, dibutyl ether, and dipropyl ether. The complex of the Lewis acids with a tertiary amine or ether may be prepared by mixing the respective materials in a suitable solvent. The catalyst complex may also be prepared by adding the Lewis acid to the ether. The resultant product which is an ether complex is more easily manipulated than some of the aforementioned gases.

It may be observed from the following examples that the reaction conditions for accomplishing the modification, i.e., stabilization and/or intercalation as set forth in the present application using dioxolane or polydioxolane, are not restricted, but, on the contrary, offer a wide variety of conditions which may be used in the different embodiments of the invention. For instance, the examples illustrate the fact that the modification of polyoxymethylene can be accomplished in any compatible medium in which the polymer can be intimately contacted with the desired stabilizing reactant. A compatible medium should be an inert liquid hydrocarbon such as toluene or ether, but any material which does not react with the polymer or the dioxolane and does not excessively deactivate the catalyst may be employed. The dioxolane and catalyst may be in the vapor phase, while the polyoxymethylene is present as a solid. Inert gases, such as nitrogen and carbon dioxide, which are relatively pure, may be added as diluents to the vapor in the case where the dioxolane and the catalyst are in the vapor phase, while the polyoxymethylene is present as a solid during the reaction. Solvents which may be employed to modify the end groups of the polyoxymethylene in a solution process may be dioxane, nitrobenzene, and tetramethyl sulfone, while nonsolvents may include ethers, hydrocarbons, alkylene and alkyl halide and like compounds which are familiar to skilled chemists.

The time of reaction may be as long as is necessary to reach completion of the reaction without excessive decomposition of the unstabilized polymer. With long reaction times, temperatures as low as 0° C. may be employed and with short reaction times, temperatures as high as 200° C. may be employed. The process may be performed under pressure if the selected reactants or conditions so dictate. The temperature, time, concentration of reactants and strength of catalyst must be balanced, as in most other reactions, so as to cause an acceptable amount of reaction in a reasonable time. The chains of the polymer are susceptible to attack by acids and may be cleaved by such an attack; therefore, it is important to adjust the reaction temperature and time so that the cleavage and other side reactions that take place are slow enough and yet the modification of the polymer is fast enough to obtain an acceptable yield.

In the preferred embodiment of the process of this invention, the reaction is carried out in an inert hydrocarbon medium and the temperature is between 25 and 150° C.; the polyoxymethylene is present as a solid; the preferred stabilizing agent, dioxolane, is present at a concentration of 0.01–100 parts per part of polyoxymethylene and the perferred catalyst, boron trifluoride etherate, is present at a concentration of 0.0001–0.5 part by weight based upon the polymer.

The polymer treated according to the present process may possess sufficient thermal stability to be molded without further refining; however, it is desirable to remove all of the unreacted polyoxymethylene. A suitable method for removal includes dissolving the polymer in the absence of oxygen in a solution containing an amine or caustic, and heating the solution to depolymerize unreacted polymer. Solvents which may be used in the presence of an amine include the aliphatic and aromatic hydroxy compounds, such as cyclohexanol, glycol, benzyl alcohol, and phenol. The preferred solvents for caustic treatment are benzyl alcohol or cyclohexanol. Amines and caustics which are useful in the purification step include triethylamine, tripropylamine, sodium hydroxide, and potassium hydroxide. Another procedure which may be employed for removing the unreacted polyoxymethylene is thermal degradation of the polymer either solid, molten or in solution without addition of an amine or a caustic after removal of any catalyst residue.

The number average molecular weight of the starting polymer and products herein may be measured by the classical methods of osmometry. However, this method is cumbersome and not particularly suitable for the lower range of molecular weights. Another method for molecular weight determination is the measurement of inherent viscosity of the polymer. This measurement of inherent viscosity bears a direct relationship to the number average molecular weight for each class of polyoxymethylene, and it is used herein to characterize the polymers. The inherent viscosity (I.V.) is measured by dissolving 0.5 gram of the polymer in 100 milliliters of reagent grade phenol which has been purified by distillation from solid caustic. The polymer is not soluble in the phenol at room temperature and usually the mixture is heated to 120° C. to increase the rate of solution of polymer. The viscosity of the phenol solvent and the viscosity of the phenol polymer solution is measured at 90° C. by noting the time required to pass the same volume of each material through an Ostwald viscometer. The inherent viscosity (I.V.) is then determined by using the following formula $$I.V. = \frac{2.303 \log \frac{\text{time of solution}}{\text{time of solvent}}}{\text{wt. of polymer in 100 cc. of phenol}}$$

This inherent viscosity may be correlated with the number average molecular weight of the polymer in each particular polymerization system in which correlation is made, e.g., an inherent viscosity of 1.0 corresponds to a number average molecular weight of 38,000, an I.V. of 1.2 corresponds to 50,000 and an I.V. of 0.5 corresponds to a number average molecular weight of 15,000 for the majority of the polymers disclosed herein.

Several methods are available to determine intercalation of —C—C— linkages into the preformed polymer. A depression in melting point of the polymer of at least 4° C. (corrected for inherent viscosity) is a definite indication of intercalation. The corrected melting point may be calculated from the observed melting point as measured by differential thermal analysis (method described hereinbelow) by applying the corrections given in the following table.

| Inherent viscosity: | Correction applied to the observed melting point (° C.) |
|---|---|
| 2.0 | −3 |
| 1.5 | −2 |
| 1.0 | 0 |
| 0.5 | 2 |

The melting point may be accurately determined by differential thermal analysis according to the general method described in the chapter "Application of Differential Thermal Analysis to High Polymers," Organic Analysis, vol. IV, page 361, Interscience Publishers, Inc. (1960). Using a Differential Thermal Analyzer, e.g., a Du Pont Model 900 adjusted to a heating rate of 10° C. per minute using glass beads as a reference, a sample of polymer is placed in a capillary tube 1.5–2.0 mm. in diameter and 2.5 cm. in length which is maintained under a nitrogen blanket. The polymer is heated to 15° C. above its original melting point. The sample is cooled for approximately five minutes until it reaches a temperature of about 130° C. When this temperature is reached, the sample is reheated and the melting point is observed. The melting points recorded for the examples were determined according to this procedure and are corrected as described above for the inherent viscosity of the particular polymer.

The amount of intercalated units may also be measured by nuclear magnetic resonance according to the general procedure outlined by G. Allen and R. Warren in Chemistry and Industry, Apr. 11, 1964. The results reported in the examples were obtained using phenol in place of the p-chloro phenol disclosed in the procedure and a "Varian" A–60 nuclear magnetic resonance spectrometer. The band associated with oxyethylene (—O—CH$_2$—CH$_2$—)

units is readily distinguished from the band associated with the oxymethylene (—CH$_2$O—) unit.

In addition to the aforementioned analysis, the treated polymer may be degraded under controlled conditions and the amount of intercalation determined from the condition of the polymer after the degradation.

The following examples serve to illustrate certain embodiments of this invention and are not intended to restrict the invention. Parts and percentages are based on weight unless otherwise specified.

EXAMPLE 1

The starting polymer for this example was prepared according to the general process of U.S. Patent 2,994,687, issued on Aug. 1, 1961 to H. H. Goodman et al., by polymerizing formaldehyde in 610 parts of dry toluene containing approximately 60 parts of dry dioxolane at a temperature of from 55–60° C. using dimethyl di(hydrogenated tallow) ammonium acetate as a catalyst. The polymer from a 50 part portion of the slurry thus obtained was esterified according to known techniques and then found to have an inherent viscosity of 0.73, a base stability of substantially 0% and a melting point of 170° C. The remaining polymer slurry containing 10.6% solids (69 parts of polymer) was vigorously agitated and cooled to 25–30° C. while 0.15 part of boron trifluoride etherate was added. After a period of 19 minutes, 175 parts of the slurry were contacted with approximately 240 parts of methanol and filtered. The polymer thus recovered (23.0 parts) was washed with acetone and dried in a vacuum over for 16 hours at a temperature of 25° C. under a blanket of nitrogen. Approximately 4 parts of the dried polymer were contacted with 52 parts of benzyl alcohol containing 0.5 part of KOH and heated to 165° C. for 15 minutes with nitrogen agitation of the liquid following which the solution was cooled at 25–30° C. and the alcohol removed by suction filtration. The remaining solids were slurried with methanol and the slurry was filtered. The polymer recovered was washed with water and twice with acetone to remove any unreacted materials following which it was dried at 90–100° C. in a vacuum oven under a nitrogen blanket for 2.5 hours. Approximately 19% of the polymer originally charged was recovered. The recovered polymer exhibited an inherent viscosity of 0.71 and a melting point of 170° C. The foregoing example illustrates that the process of the present invention may be employed to enhance the base stability of the polymer without substantial modification of its physical properties.

EXAMPLE 2

The starting material for this example was prepared according to the process disclosed in the aforementioned U.S. Patent 2,994,687, using dimethyl di(hydrogenated tallow) ammonium acetate as a catalyst, which polymer exhibited an inherent viscosity of 1.1 and was substantially 0% base stable. Approximately 50 parts of this polymer were charged to a flask along with 130 parts of dry toluene and 17 parts of dry dioxolane. The contents of the flask were stirred with a standard type of "Teflon" coated magnetic stirring bar. After the agitator was started, 0.09 part of triethyloxonium fluoborate was introduced into the reactor and the temperature was increased to 60° C. and maintained at that temperature for approximately 45 minutes. The slurry was cooled to room temperature and the polymer recovered by filtration, washed three times with approximately 200 parts of acetone each time, and dried in a vacuum oven at 70° C. for four hours. Approximately 50 parts by weight of polymer were recovered. Approximately 85.9% of the polymer was recovered when treated with the base as disclosed in Example 1. This base stable fraction exhibited an inherent viscosity of 0.55 and a melting point of 161° C. as compared to a melting point of the untreated polymer of 171° C. It should be apparent from the foregoing example that the process of the present invention may be employed to modify both the physical and chemical properties of the polymer, e.g., an increase in the base stable fraction and a decrease in the melting point of the polymer. This example demonstrates that the polymerization portion of the process may be conducted in the absence of the modifying reactant and that the polymer may be isolated between the polymerization and modification steps.

EXAMPLE 3

The polymer employed in this example was prepared according to the following technique. Formaldehyde gas was generated by continuously pyrolyzing cyclohexyl hemiformal at approximately 150° C. and directing the pyrolysis vapors to a condenser, the temperature of which was regulated to condense cyclohexanol and water and to permit formaldehyde gas to pass through. The gas was then directed through a series of six U-tubes approximately 1 inch in diameter by 12 inches in height which were packed with stainless steel packing and maintained at a temperature of −18° C. by immersing approximately 10 inches of the lower portion of the U-tube in an acetone bath cooled by solid carbon dioxide. The vapors were then directed into a reactor which had been thoroughly dried and contained 157 parts of dry toluene and 21 parts of dry dioxolane. After saturating the toluene with formaldehyde (approximately 2 minutes after introduction of the gas), 0.024 part of a lecithin (vegetable source) catalyst was added to the reaction medium and the temperature maintained at 40° C. for 10 minutes following which the introduction of formaldehyde was stopped. Approximately 0.034 part of boron trifluoride etherate was added to the slurry thus obtained and the temperature increased to 70° C. After maintaining that temperature for 30 minutes, the reaction was terminated by the addition of 1 part of triethylamine. The solid polymer was recovered by filtration and washed and dried as set forth in Example 2 to yield 13.5 parts of dry polymer. This polymer exhibited a base stable fraction of 76%, had an inherent viscosity of 0.57 and a melting point of 166° C. This example demonstrates chemical and physical modification of a polyoxymethylene which was originally prepared from a catalyst different from that set forth in the Examples 1 and 2.

EXAMPLE 4

The polyoxymethylene was prepared as set forth in Example 3 except that 0.0018 part of tin tetrabromide was used as the polymerization catalyst and the polymerization was conducted at a temperature of 25° C. for a period of 20 minutes. After completion of the polymerization, the formaldehyde addition was stopped and 0.034 part of boron trifluoride etherate was added to the slurry and the temperature raised to 70° C. and maintained at that temperature for 30 minutes. The product was worked up as set forth in Example 3 and 21 parts of polymer were obtained. The treated product exhibited a base stable fraction of 89%, an inherent viscosity of 1.0 and a melting point as determined by differential thermal analysis of 163° C. It was determined by nuclear magnetic resonance measurement that approximately 2.6 mole percent of (—C—C—) linkages had been incorporated into the main chains of the starting polymer by the post-polymerization modification.

EXAMPLE 5

The starting polymer for this example was a high molecular weight polyoxymethylene homopolymer which had been etherified by known techniques and precipitated from 1,4-dioxane. This reprecipitated, substantially 100% base stable polymer exhibited an inherent viscosity of 0.76 and a melting point of 171.5° C. Approximately 105 parts of this reprecipitated polymer were charged to the apparatus described in Example 1 which contained 370 parts of dry n-heptane and 60 parts of dry 1,3-dioxolane. The slurry thus obtained was heated to 70° C. and 0.11 part of boron trifluoride etherate was injected into the reactor and the reaction continued for 37 minutes, following which the polymer was recovered and treated according to the purification and base treatment shown in Example 1. The product exhibited a base stable fraction of 85%, an inherent viscosity of 0.47 and a melting point of 165.5° C. The foregoing example illustrates that a polymer obtained from solution precipitation which already possesses substantially 100% base stability, may be modified according to the process of the present invention, as evidenced by the decrease of melting point.

Additional experiments indicate that other reaction media may be employed, e.g., trichloroethylene, in place of the heptane or toluene disclosed in the foregoing examples.

EXAMPLE 6

The following example illustrates the employment of polydioxolane as the modifying reactant in the process of the present invention. Approximately 31.8 parts of dry dioxolane were homopolymerized in a round-bottomed flask by introducing 0.069 part of boron trifluoride etherate into the dioxolane and heating at a temperature of 70° C. for approximately 20 minutes. The viscous sirup formed by the foregoing polymerization was diluted with 43.5 parts of dry toluene and added to a flask which contained 113 parts of dry toluene and 30 parts of a polyoxymethylene dimethylether homopolymer, which polymer exhibited an inherent viscosity of 1.57 and was substantially 100% base stable. The polyoxymethylene diether had a melting point of 170° C. The contents of the reactor were heated to 70° C. and maintained at that temperature for 20 minutes following which 2 parts of triethylamine were added to the reaction mixture to terminate the reaction. The mixture was cooled and the polymer isolated and purified according to Example 4. Approximately 29.4 parts of polymer were recovered which polymer exhibited a base stability of 78%, an inherent viscosity of 0.81, and a melting point of 169° C. It was determined by subjecting the polymer to controlled degradation that approximately 0.5 mole percent of (—C—C—) linkages had been inserted in the chain of the starting polymer.

EXAMPLE 7

Formaldehyde monomer generated according to Example 3 was passed into a reactor which had been thoroughly dried and contained 61 parts of heptane. After saturating the heptane with formaldehyde (approximately two minutes after introduction of the gas) 0.012 part of lecithin was added to the reactor and the temperature maintained at 40° C. for 20 minutes. The polyoxymethylene made under these conditions has a base stability of essentially 0%. The flow of formaldehyde to the reactor was stopped, the temperature of the slurry reduced to 25° and 10.6 parts of liquid dioxolane followed by approximately 0.023 part of boron trifluoride etherate were added, with stirring, to the reactor. The slurry temperature was maintained at 25° C. for 18 hours. At the end of the 18-hour period, the reaction was terminated by adding one part of triethylamine. The solid polymer was separated by filtration, washed and dried as set forth in Example 2 to yield 5.4 parts of dry polymer. This polymer exhibited a base stable fraction of 79% and had an inherent viscosity of 0.43. Additional experiments indicated that phosphorus pentafluoride may be substituted for the boron trifluoride etherate as the catalyst in the process described in Example 7.

We claim:

1. A process for modifying a polyoxymethylene which comprises reacting in a mildly acidic reaction medium, a polyoxymethylene having a number average molecular weight of at least 10,000 with a compound selected from the class consisting of dioxolane and polydioxolane at a temperature of 0–200° C. whereby at least one dioxolane unit is inserted in the chain of said polyoxymethylene, and thereafter recovering a polyoxymethylene having a number average molecular weight of at least 10,000 and having modified properties as compared to said starting material.

2. The process of claim 1 wherein the reaction is conducted in the temperature range 25–150° C.

3. The process of claim 2 wherein the reaction is conducted in the presence of boron trifluoride etherate.

4. A process for the modification of a polyoxymethylene which comprises reacting one part by weight of a polyoxymethylene starting polymer having a number average molecular weight of at least 10,000 with 0.01–100 parts by weight of dioxolane in the presence of 0.0001–0.5 part of a Lewis acid at a temperature in the range 25–150° C., contacting the reacted polyoxymethylene with a base, and thereafter recovering a modified polyoxymethylene having a number average molecular weight of at least 10,000 and having a corrected melting point of at least 4° C. below the melting point of said starting polymer.

5. The process of claim 4 wherein the Lewis acid is boron trifluoride etherate.

6. The process of claim 5 wherein said etherate is present in the amount 0.0001–0.1 part.

7. The process of claim 4 wherein said Lewis acid is phosphorus pentafluoride.

8. The process of claim 4 wherein said Lewis acid is triethyl oxonium fluoborate.

9. A process for the modification of a polyoxymethylene which comprises contacting one part of a polyoxymethylene having a number average molecular weight of at least 10,000 in 2–20 parts of an inert normally liquid hydrocarbon with 0.1–10 parts of dioxolane in the presence of 0.0001–0.01 part of boron trifluoride etherate and at a temperature in the range 40–80° C., recovering the treated polymer, contacting the treated polymer with potassium hydroxide in the presence of an alcohol, and thereafter obtaining a substantially base stable polyoxymethylene having a number average molecular weight of at least 10,000 and having a corrected melting point of at least 4° C. below the melting point of said starting polymer.

10. A process for the modification of a polyoxymethylene which comprises contacting one part of a polyoxymethylene having a number average molecular weight of at least 10,000 in 2–20 parts of an inert normally liquid hydrocarbon with 0.1–10 parts of polydioxolane in the presence of 0.001–0.01 part of boron trifluoride etherate and at a temperature in the range 25–150° C. whereby at least one dioxolane unit is intercalated into the chain of said polyoxymethylene, recovering the treated polymer, contacting the treated polymer with potassium hydroxide in the presence of an alcohol, and thereafter obtaining a substantially base stable polyoxymethylene having a number average molecular weight of at least 10,000.

11. A process for preparing a copolymer containing predominantly oxymethylene units which comprises reacting a high molecular weight polyoxymethylene starting homopolymer with dioxolane or polydioxolane in the presence of sufficient Lewis acid and at a temperature whereby more than one dioxolane unit is intercalated in the chain of said starting homopolymer, and thereafter recovering said copolymer.

References Cited

UNITED STATES PATENTS

| | | | |
|---|---|---|---|
| 3,027,352 | 3/1962 | Walling et al. | 260—67 |
| 3,183,211 | 5/1965 | Brinker et al. | 260—67 |

OTHER REFERENCES

Kern et al., English translation (Angewandte Chemie, vol. 73 to 6 (March 1961), pp. 177–186), pp. 15–21.

WILLIAM H. SHORT, *Primary Examiner.*

L. M. PHYNES, *Assistant Examiner.*